March 6, 1951     N. J. HENDRICKSON     2,543,849

TREE HOLDER

Filed April 8, 1949

INVENTOR.
Norman J. Hendrickson
BY
Sam J. Slotsky
ATTORNEY

Patented Mar. 6, 1951

2,543,849

UNITED STATES PATENT OFFICE 2,543,849

TREE HOLDER

Norman J. Hendrickson, Sioux City, Iowa

Application April 8, 1949, Serial No. 86,213

2 Claims. (Cl. 248—44)

1

My invention relates to a tree holder.

An object of my invention is to provide a tree holder having a stable base whereby the tree will be held in secure position, and to further provide means for clamping the tree to the holder.

A further object of my invention is to provide an arrangement whereby trees having varied trunk diameters can be accommodated to the arrangement.

A further object of my invention is to provide a trunk receiving arrangement in which water or other substance can be placed for maintaining the tree in a freshened condition.

A further object of my invention is to provide a ball and socket arrangement for supporting the tree, and which socket arrangement can be loosened so that the tree can be pivoted downwardly for trimming the same, and thence be again placed in the vertical position, with frictional means for holding the tree in any of said positions.

A further object of my invention is to provide simple arrangements for tightening the various adjustable features of the holder.

Figure 1:
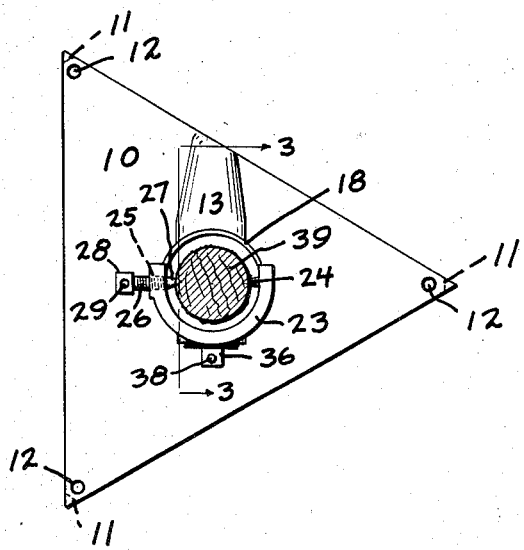
Figure 2:
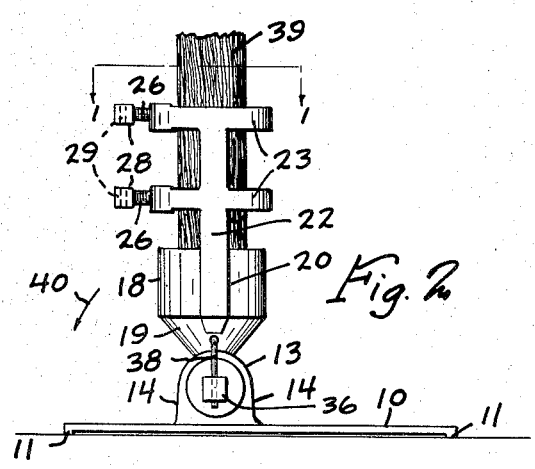
Figure 4:
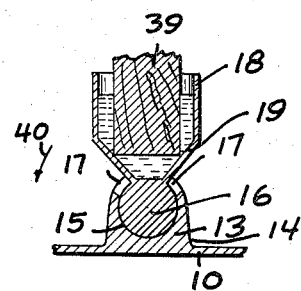
Figure 3:
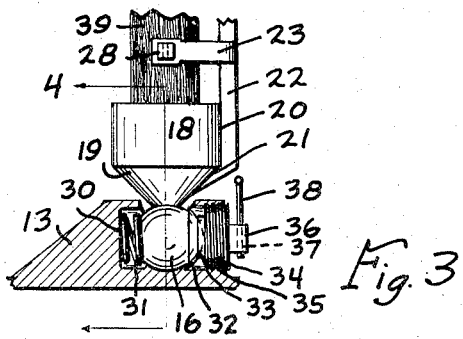

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the holder and taken along the lines 1—1 of Figure 2, Figure 2 is a side elevation of the holder, Figure 3 is a sectional view taken substantially along the lines 3—3 of Figure 1, and Figure 4 is a sectional view taken along the lines 4—4 of Figure 3.

My invention contemplates a tree holder, and especially a holder for Christmas trees and the like whereby the tree can be quickly and conveniently secured in upright position, and with the holder including other features enabling a person to trim the tree, etc.

I have used the character 10 to desgnite the substantially flat base of the holder which is made of any suitable material, the base including the downwardly extending corner portions 11, these portions acting as legs whereby a three point support is provided which insures constant contact of the base with the floor, and it will be noted that the base 10 is triangular in shape, or having three extending angular portions, it being understood that any shape of triangle can be used without departing from the spirit of the invention herein.

2

The base 10 includes the openings 12 positioned in the corners thereof, these openings allowing the reception of nails or screws, if it is desired to make the base more solid, although usually this is not required, since the base will have sufficient stability.

Merging integrally with the base 10 is a cast portion 13 substantially semi-cylindrical in shape and having the side walls 14. The member 13 includes the inner partially spherical wall 15 (see Fig. 4), and snugly received against the wall 15 is the solid ball 16. The member 13 includes the open portions at 17. Attached to the ball 16 is a hollow cylindrical cup 18 merging into the downwardly extending conical portion 19, which portion 19 is attached to the ball 16. The cup 18 is made of sufficient diameter to accommodate a variety of sizes of tree trunks, and attached to this cup at 20 and 21 is an upwardly extending bar 22 which merges integrally with the arcuate clamp members 23, which clamp members 23 are spaced a substantial distance apart, the clamp members including a pair of points 24 attached thereto, and the clamp members 23 further including the threaded openings at 25 for the reception of the threaded screws 26 which screws 26 include the further points 27, the screws 26 having the heads 28 including the openings 29. The member 13 (see Fig. 3) includes an inner wall 30 against which is positioned a strong helical compression spring 31 which bears against the ball 16, a further dished washer 32 receiving a portion of the ball 16, the washer 32 being received within the end 33 of a threaded plug 34 which is threadably engaged at 35 with the other end of the member 13, the plug 34 including the extending portion 36 having an opening 37 for the reception of a turning bar 38.

The lower end of the trunk of the Christmas tree, which trunk is indicated by the character 39, is inserted within the receptacle 18, with the lower edge thereof being positioned against the tapered walls 19, and then the screws 26 are turned inwardly until the points 27 penetrate into the trunk 39, this action causing the further points 24 to penetrate also. The screws 26 are turned by means of the rod 38 which can be removed from the other opening 37 of the portion 36. The cup 18 can be filled with water, or water and sand as desired. The tree can be placed in the arrangement at any convenient angle by simply loosening the plug 34, using the same rod 38 which will allow the ball 16 to pivot, the tree can then be placed in vertical position and the plug 34 tightened securely against the washer 32 and against the spring 31 thereby locking the tree in desired position.

This threaded plug also permits loosening of the ball and socket joint so that the tree can be swung downwardly as in the direction of the arrow 40 for trimming the same, after which it can be then raised to its vertical position.

It will be noted that the constant spring pressure at all times maintains sufficient frictional engagement so that the tree cannot drop suddenly, yet will allow it to be positioned as explained above. The spaced positioning of the brackets 23 provides a firm grip of the trunk at sufficiently spaced distances, and the triangular base also insures a maximum extent of the base in three directions to provide a secure support.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tree holder comprising a triangular base, a tree trunk receiving receptacle secured to said base, said receptacle including a pair of spaced clamps attached thereto, means for securing a tree trunk with said clamps, including threaded studs threadably engaging said clamps and having penetrating points for passing into the tree trunks, said clamps having opposed points for penetration into the tree trunk, said receptacle being pivotally attached to said base whereby the tree supported in said receptacle can be positioned angularly as desired, said receptacle including a ball attached at the bottom thereof, a socket snugly engaging said ball, a spring bearing against said ball, a threaded plug threadably engaged with said socket for tightening said ball against said spring.

2. A tree holder comprising a triangular base, a tree trunk receiving receptacle secured to said base, said receptacle including a pair of spaced clamps attached thereto, means for securing a tree trunk with said clamps, including threaded studs threadably engaging said clamps and having penetrating points for passing into the tree trunks, said clamps having opposed points for penetration into the tree trunk, said receptacle being pivotally attached to said base whereby the tree supported in said receptacle can be positioned angularly as desired, said receptacle including a ball attached at the bottom thereof, a socket snugly engaging said ball, a spring bearing against said ball, a threaded plug threadably engaged with said socket for tightening said ball against said spring, said plug and said studs having extending portions having openings therein, a turning bar common to said openings for turning either said plug or said studs.

NORMAN J. HENDRICKSON.

REFERENCES CITED

The following references are of record in the file of this patent:

UNITED STATES PATENTS

| Number | Name | Date |
| --- | --- | --- |
| 1,971,300 | Garrett | Aug. 21, 1934 |

FOREIGN PATENTS

| Number | Country | Date |
| --- | --- | --- |
| 235,181 | Germany | June 3, 1911 |